United States Patent Office  3,746,734
Patented July 17, 1973

3,746,734
ACRYLATE OR METHACRYLATE SILANES
Abe Berger and Terry G. Selin, Schenectady, N.Y., assignors to General Electric Company, Waterford, N.Y.
No Drawing. Filed Feb. 4, 1972, Ser. No. 223,701
Int. Cl. C07f 7/08, 7/18
U.S. Cl. 260—448.2 B      20 Claims

ABSTRACT OF THE DISCLOSURE

Acryloxy or methacryloxy substituted silicone compound of the formula:

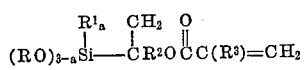

wherein R is H or is a monovalent organic radical free of non-benzenoid unsaturation; $R^1$ is halogen or a monovalent hydrocarbon radical free of non-benzenoid unsaturation; $R^2$ is a divalent hydrocarbon radical; $R^3$ is H or $CH_3$; $a$ is a whole number integer from 0 to 3 inclusive; isomeric mixtures thereof; and process of preparation are provided.

BACKGROUND OF THE INVENTION

The present invention is concerned with new organosilicon materials, and their method of preparation. In particular, the present invention relates to new acryloxy and methacryloxy substituted organosilanes and their method of preparation.

The use of reinforcing materials such as fibers, fabrics, and fillers in curable polymeric compositions has greatly extended the applications to which such compositions can be utilized. For instance, glass fabric reinforced or glass fiber-filled plastic sheets are important commercial materials. Of particular importance are those products obtained from glass cloth-polyester resin compositions. Such are particularly useful in aircraft construction, boat hulls, automobile bodies, bathtubs, and fishing rods because of their high strength and relatively light weight.

The usefulness of a particular composition for a particular purpose is dependent upon the strength of the bond between such reinforcing material and curable polymer composition under the conditions of intended use. Accordingly it has usually been necessary to treat the reinforcing materials so as to promote their adhesion to the polymer compositions. For instance, coupling agents have been used on glass fibers or cloths to significantly improve the overall physical strength of glass-reinforced resin compositions. In addition vinyl containing silanes have been used as such coupling agents. It is believed that vinyl silanes function as coupling agents by locking onto the surface of a glass reinforcement fiber or cloth through formation of ≡Si—O—Si≡ linkages and with the curable polymer such as by the vinyl group copolymerizing with a vinyl group present in the curable polymer composition.

In addition, it has recently been disclosed by Marsden et al. in U.S. Pat. 3,555,051 that certain organosilicon compounds such as

provide improved results when incorporated in curable polymeric systems.

Such silanes still do not possess the desired degree of reactivity necessary for various commercial operations. Accordingly, it would be desirable to provide silane materials which have improved reactivity so that lower cure temperatures and/or faster cure times and/or lesser amounts of catalyst could be employed in the curing of the silane materials. Moreover it would be desirable to obtain materials with increased reactivity without a concomitant sacrifice in the storage stability and hydrolytic stability characteristics.

Therefore it is an object of the present invention to provide acryloxy or methacryloxy silanes having improved reactivity without sacrificing storage and hydrolytic stability.

It is another object of the present invention to provide an improved process to obtain such materials. Another object of the present invention is to provide a process whereby exceptionally high yields of the desired product can be readily obtained.

SUMMARY OF THE INVENTION

The composition aspects of the present invention are concerned with compounds represented by the formula:

(I)  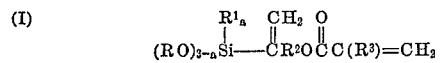

and isomeric mixtures thereof with compounds represented by the formula:

(II)  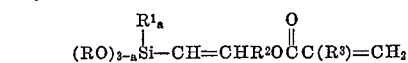

wherein R is H or a monovalent organic radical free of non-benzenoid unsaturation; $R^1$ is halogen or a monovalent hydrocarbon radical free of non-benzenoid unsaturation; $R^2$ is a divalent hydrocarbon radical; $R^3$ is H or $CH_3$; and $a$ is a whole number integer from 0 to 3 inclusive.

The process aspect of the present invention comprises reacting at a temperature of up to 90° C., a silane containing an Si—H bond such as a silane of the formula:

(III)  

with an acetylenically unsaturated ester of the formula:

(IV)     $CH_2=C(R^3)COOR^2C\equiv CH$ in the presence of a catalytic amount of a platinum-containing compound for a time sufficient to produce the compounds of Formulas I and II; wherein R, $R^1$, $R^2$, $R^3$, and $a$ have the same meanings as defined above.

DESCRIPTION OF PREFERRED EMBODIMENTS

The new organosilicon compounds of the present invention correspond to the formula:

(I)  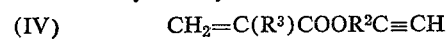

R is hydrogen or a monovalent organic radical free of non-benzenoid unsaturation such as alkyl group, aryl group, alkaryl group, aralkyl group, cycloalkyl group, and acyl group. Illustrative of R groups are alkyl groups such as methyl, ethyl, propyl, isopropyl, butyl, isobutyl, amyl, hexyl; aryl, such as phenyl, naphthyl, aralkyl groups such as benzyl, phenylethyl, alkaryl groups such as ethylphenyl, dimethylphenyl, mesityl, cycloaliphatic groups such as cyclopentyl, cyclohexyl; and acyl groups such as acetyl, propionyl, butyryl, and benzoyl. Preferably R is an alkyl group containing up to 6 inclusive carbon atoms and most preferably R is methyl.

$R^1$ in the above formula may be a halogen such as chlorine or a monovalent hydrocarbon radical free of non-benzenoid unsaturation. Such hydrocarbon radicals include alkyl groups such as methyl, ethyl, propyl, isopropyl, butyl, isobutyl, amyl, hexyl, etc.; aryl groups such as phenyl, naphthyl, etc.; aralkyl groups such as benzyl, phenylethyl, etc.; alkaryl groups such as ethylphenyl, dimethylphenyl, mesityl, etc.; and cycloaliphatic groups such as cyclopentyl, cyclohexyl, etc. Preferably, $R^1$ is chlorine.

Of course R or $R^1$ can be mixtures of the above discussed radicals, *a* is a whole number integer from 0 to 3 inclusive and preferably is either 0 or 3.

R² is a divalent hydrocarbon radical which is usually a linear aliphatic chain which may or may not contain olefinic double bonds. Preferably, these linear aliphatic chains contain from 1 to 5 carbon atoms, but longer chains can be employed when desired. Illustrative of some linear R² radicals include —CH₂—; —CH₂CH₂—; —CH₂CH₂CH₂—;
—CH₂CH₂(CH₃)—; —CH=CH—; —CH₂CH=CH—;
—CH₂CH₂CH=CH—; —CH₂CH=CHCH₂—;
—CH₂CH₂CH₂CH=CH—; —CH₂CH=CHCH₂CH₂—;
—CH=CHCH₂CH₂CH₂—.

In addition R² can be a branched aliphatic chain containing ethylenic unsaturation such as

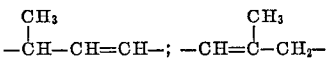

R² may also be an arylene groups such as,

a cycloalkylene group such as

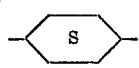

or an aryl or cycloalkyl substituted alkylene group such as

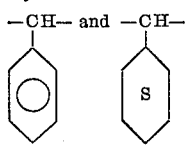

Preferably R² is —CH₂—.

Since the compounds of this invention have an ethylenically unsaturated group pendant from the chain of the compound as a branch thereof, such are much more reactive than the corresponding compounds wherein the unsaturation is within the chain. Accordingly, the compounds of the present invention can be cured at lower temperature, if desired, as compared to corresponding compounds wherein the double bond is along the chain. This is advantageous when the materials which are to be coated with these compounds are deleteriously affected by high temperatures. For example, compounds of the present invention can cure at temperature of about 80° C. in the presence of a free radical catalyst as compared to corresponding isomers containing unsaturation within the chain which require temperatures of about 120–130° C. for curing at the same conditions of cure time and catalyst. In addition, for those applications wherein speed is a major concern, the compounds of the present invention are advantageous as compared to the isomer compounds wherein all the unsaturation is along the chain. The compounds of this invention will cure at a much faster rate at the same temperature than the corresponding isomer compounds. In addition, the increased reactivity of the compounds of this invention makes it possible to lessen the amount of catalyst usually necessary to promote the cure of prior silane materials. Another advantage of the compounds of this invention is that they are reactive with a much greater variety of materials than are the corresponding isomers wherein all the double bonds are along the chain of the compound. Furthermore, no differences in storage stability and hydrolytic stability have been observed for the compounds of the present invention as compared to the isomers thereof. This is quite advantageous since the compounds disclosed herein provide the desirable combination of increased reactivity along with good storage and hydrolytic stability. It is quite advantageous that the improvement of reactivity was not achieved at the expense of a reduction in the storage and hydrolytic stability of the material.

Another particular advantage of the present invention is that isomeric mixtures of the above-discussed compounds with compounds represented by the formula:

(II) 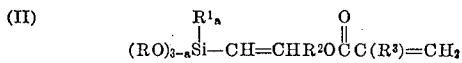

wherein R, R¹, R², R³, and *a* have the same meanings as defined above are obtainable. Generally such isomeric mixtures contain from about 70% to about 30% by weight of the compounds corresponding to Formula I which will be referred to hereinafter as the beta (β) isomer; and correspondingly from about 30% to about 70% by weight of compounds of Formula II which will be referred to hereinafter as the alpha (α) isomer. By being able to prepare isomeric mixtures of these two materials, it is possible to readily tailor the reactivity of the composition to suit a particular application of the composition. As will be discussed hereinbelow, the reaction can be varied along certain lines so as to control the relative amounts of these two different isomers within certain limits.

The compounds of the present invention are prepared by reacting at a temperature of up to 90° C., a silane containing Si–H bond such as a silane of the formula:

(III) 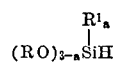

with an acetylenically unsaturated ester of the formula:

(IV) 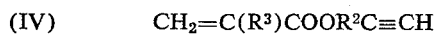

in the presence of a catalytic amount of a platinum containing material for a time sufficient to produce the compounds of Formulas I and II; wherein R, R¹, R², R³, and *a* have the same meanings as defined above. Preferably the silane containing at least one Si—H bond is either HSiCl₃ or HSi(OCH₃)₃. Exmples of some suitable acetylenically unsaturated esters include propargyl methacrylate and propargyl acrylate.

The relative amounts of reactants can be varied over a relatively wide range, and can be conducted employing stoichiometric amounts. Usually a molar excess of up to about 15% of one of the reactants, and preferably the less expensive reactant, is employed.

It is important that the reaction temperature be maintained below 90° C. in order to obtain the materials desired from the present process in good yields and in order to prevent premature polymerization of the materials. Temperatures above 90° C. even when a polymerization inhibitor is present are quite susceptible to pregelling or premature polymerization which could render the product unsuitable for its intended purpose. Usually the temperature is at least room temperature and preferably the temperature of the reaction is maintained between about 50 and about 65° C.

The process is carried out in the presence of a catalytic amount of a platinum-containing compound. Usually the platinum-containing compound is present in an amount to provide from about 10⁻⁶ to about 10⁻⁴ moles of platinum and preferably about 10⁻⁵ moles of platinum per mole silane reactant. Excellent results have been observed when the platinum-containing compound is a complex formed from chloroplatinic acid with up to 2 moles per gram-atom of platinum of a member selected from the class consisting of alcohols having the formula R⁴OH, ethers having the formula R⁴OR⁵, aldehydes having the formula R⁴CHO and mixtures of the above as described and claimed in the application of Harry F. Lamoreaux, Ser. No. 207,076, filed July 2, 1962, now U.S. 3,220,972 and assigned to the same assignee as the present invention. The substituent R⁴ in the above formulas is a member selected from the class consisting of alkyl radicals having at least 4 carbon atoms, alkyl radicals substituted with an aromatic hydrocarbon radical, and an alkyl radical substituted with an OR⁵ group where R⁵ is a member selected from the group consisting of monovalent hydrocarbon radicals free of aliphatic unsaturation and monovalent radicals free of aliphatic unsaturation and consisting of carbon, hydrogen, and oxygen atoms with each oxygen atom being attached to two atoms, at least one of which is a carbon atom and up to one of which is a hydrogen atom. A preferred platinum compound is obtained by dissolving one mole of $H_2PtCl_6 \cdot 6H_2O$ in 7 moles of octyl alcohol. This platinum-alcohol solution is maintained at a temperature of 75° to 80° C. and a pressure of approximately 15 to 20 mm. for 60 hours while the ratio of chlorine to platinum is reduced to 2 atoms of chlorine per atom of platinum.

In addition, it is preferred to employ a polymerization inhibitor in the reaction mixture. The polymerization inhibitors utilized when the above-discussed specific platinum catalyst described in Ser. No. 207,076 are employed should usually be in the hydroquinone or hindered phenolic type such as 2,6-di-tert.butylphenol. Polymerization inhibitors which contain sulfur or certain amines such as phenothiazine or N,N'-diphenylparaphenylenediamine should be avoided with such platinum catalysts since they tend to destroy the activity of these catalysts. However, tertiary amines can be tolerated with these specific types of platinum catalysts.

The reaction is generally carried out at atmospheric pressure. However, higher or lower pressures can be used, when desired. The time for the reaction is primarily dependent upon such factors as amounts of reactants, the specific reactants, and the temperature. Most commercial operations require between about 6 and 24 hours for completion of the reaction.

By following the process of the present invention, it is possible to obtain yields up to about 95% of the theoretical yield. Moreover, it was quite surprising that the beta isomer is produced in substantial quantities according to the present process. For instance, the beta isomer was not reported in the Marsden et al. patent which specifically employed a process outside the scope of this invention. Also, the process of this invention provides yields considerably greater than those recorded in that patent.

Another surprising aspect of this invention is that by proper selection of the silane starting material, it is possible to control the relative quantities of the alpha and beta isomers within certain limits. Unexpectedly, it was discovered that reactions within the scope of the present invention starting with a trialkoxy silane such as trimethoxy silane produced about 65% beta isomer and correspondingly about 35% alpha isomer.

On the other hand, when the same reaction is carried out except that the trimethoxy silane is replaced with equivalent moles of trichlorosilane the beta isomer is present in amounts of about 30–40% while the alpha isomer is present in amounts of about 70–60%. Accordingly, it is readily apparent that depending upon which isomer is the most desirable one for a particular application, it is possible to regulate the process to obtain the desired isomer as the predominant product.

When the trichlorosilane is employed as the starting material, usually the reaction entails an additional step of alkoxylation with an alcohol such as methanol to provide the alkoxy-containing compounds of the present invention which are the preferred adhesion promoters. The alkoxylation is generally carried out in the presence of a polymerization inhibitor. The preferred inhibitor for this step has been found to be phenothiazine. Moreover it is preferred to distill the product before the alkoxylation to obtain improved yields of desired product.

The desired products are removed from the reaction mass such as by distillation. During the distillation it is important to incorporate a polymerization inhibitor in view of the high reactivity of the materials. It has been found that phenothiazine provides excellent results as a polymerization inhibitor during the distillation. It is important however that the distillation temperature and time of distillation be carefully monitored. The distillation should not exceed about 140° C. and the material should not be at that temperature for more than one hour. Preferably, the distillation temperature is about 110° C. In addition, the distillation is usually carried out by employing a molecular still. Molecular distillation is where the vapor path is unobstructed and the condenser is separated from the evaporator by a distance less than the mean free path of the evaporating molecules. Commercial molecular stills are usually designed to achieve a vacuum of about 0.0001 to 0.001 mm. of Hg of absolute pressure. However, in view of the vapor pressure of the products of this invention, the pressure of the distillation is usually between about 0.1 to 1 mm. of Hg of absolute pressure. A more detailed discussion of molecular distillation can be found on pages 655–660 of Chemical Engineers Handbook by Perry, 3rd edition, McGraw-Hill Book Company, 1950. The method starting with the trichlorosilane may be preferred over the one starting with a trialkoxysilane for a commercial operation because of the toxic nature of the trialkoxy silane. When desired the two isomers can be separated from each other by fractional distillation methods. For example, the α and β isomers of methacryloxy propenyltrimethoxysilane can be individually obtained by fractional distillation, particularly at pressures of 1.5 mm. of Hg and less and temperatures between about 80 and 110° C. Likewise, the α and β isomers of methacryloxypropenyltrichlorosilane can be individually obtained by employing similar temperatures and pressures. Generally, the β isomers are lower boiling than the corresponding α isomers.

When the compositions of the present invention are employed to provide composite articles of improved strength by improving the adhesion between the reinforcing filler and the curable polymer they can be used according to two general procedures. One method comprises initially treating the reinforcing filler with the silane, curing the silane and then applying the polymer to the treated filler. Another method is to initially add the silane to the curable polymer and then apply the mixture to the filler. The silane is generally cured employing a free radical generating agent such as a peroxide. It is further recognized that the compositions of the present invention can be used as primary coatings on numerous substrates particularly where it is desired to improve adhesion of the substrate to another material.

The silicone material of the present invention can be applied as a dilute solution or dispersion. For example, the solution or dispersion may contain about 1–2% by weight of the silicone. The coating of the silicone on the desired substrate can be accomplished by any suitable convenient coating procedure such as by immersing the substrate into a solution of the ester of the present invention. Most of the silicone compounds of the present invention may be dissolved in water or may be converted to a water soluble or water dispersible form by hydrolysis of the OR or $R^1$ groups. This hydrolysis may be catalyzed by the use of either acids or bases. Organic solvents may also be employed either by themselves or in admixtures with water. Such solvents include the alkanols and the ether alkanols, such as ethanol, propanol, methoxyethanol, ethoxyethanol and the like, and the aromatic hydrocarbons, such as benzene, toluene, xylene and the like. Compounds of the present invention have been applied as solutions in aqueous acetic acid solutions having pH between about 3 and 5.

It is further recognized that the compositions of the present invention can be hydrolyzed to provide polymeric materials which can later be used as adhesion promoters. Such hydrolyzed siloxane polymers may be characterized as having the unit formula:

(V) 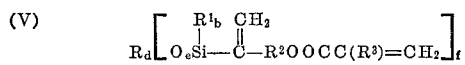

wherein $b$ is an integer having a value from 0 to 2 inclusive; $d$ is zero or a positive number; $e$ is $3-b/2$; $f$ is greater than one and indicates the degree of polymerization; and R, $R^1$, $R^2$, and $R^3$ have the same meanings as defined above.

Because of the increased reactivity of the compositions of the present invention, they can be employed in conjunction with a wide variety of curable polymeric materials to provide highly successful structures. For example the compositions of the present invention can be used with curable polymer materials which contain reactive unsaturated groups and are catalyzed for curing by either free-radical generating agents such as organic peroxides and radiation obtained for example from high voltage accelerators and nucler reactors or by use of ionic curing agents such as Lewis acid. In addition, the compounds of the present invention can be used in conjunction with polymerizable materials which are free of reactive unsaturated groups but are capable of reacting with the silicone in the presence of the above-mentioned free-radical generating agents.

Some examples of suitable unsaturated group containing polymers include unsaturated polyesters. For example, the reaction products of maleic anhydride, phthalic anhydride or fumaric acid and ethylene glycol, diethylene glycol or propylene glycol which has been diluted with from about 10 to 40 weight percent monomeric styrene or divinyl benzene as well as the corresponding alcohol-acid and oil-modified products. Such resins also include blends of polyesters with other reactive unsaturated groups. These resins typically contain residual hydroxy and/or carboxy groups which are most suitable for reaction with epoxy groups. Further examples of curable polymers include polyacrylonitrile, polystyrene, polydichlorostyrene, poly-alphamethylstyrene, polyvinylchloride, polyvinylacetate, polyvinylbutyrate, polyvinylalcohol, polyvinylcarbazole, polyvinylidene chloride, polymethylacrylate, polyethylacrylate, and polymethylmethacrylate.

In addition, drying oils such as cottonseed oil, soybean oil, dehydrated castor oil, linseed oil, perilla oil, tung oil, and oiticica oil can be employed as the polymerizable material.

Examples of suitable curable materials which are free of reactive unsaturated groups but are capable of reaction with the present silicone materials in the presence of free-radical generating agents include thermoplastic materials such as polyethylene, polypropylene, polyurethane, polyfluoroethylene and their copolymers; and aldehyde condensation resins, such as phenol-formaldehyde resins, phenol-acetaldehyde resins, phenol-furfural resins, cresol-formaldehyde resins, urea-formaldehyde resins, melamine-formaldehyde resins and the like.

Other suitable polymeric materials include the epoxy-type resins which comprise, for example, the glycidyl ethers of polyhydric phenols as well as blends of such diglycidyl ethers of polyhydric phenols with such modifying ingredients as the polyphenol compounds. Other useful epoxy resins include derivatives of cyclohexene epoxide; for example, 3,4 - epoxy-6-methyl-cyclohexymethyl-3,4-epoxy - 6 - methylcyclohexanecarboxylate, 1-epoxyethyl-3,4-epoxyclohexane, dicyclopentadiene dioxide and the like. Also included are the amorphous plastic materials such as natural rubber, buna rubber, butadiene polymers, isoprene, neoprene, butadiene-acrylonitrile copolymers, butadiene-isobutylene copolymers, butadiene-styrene copolymers, polymerized 2-chloro-1,3-butadiene, polychloroprene, polyisobutylene and the like. In addition curable polysiloxane can be used as the curable polymeric material. Such polysiloxanes are represented by the formula:

(VI) 

wherein $R^6$ is a monovalent organic radical attached to silicon through carbon-silicon linkages and $n$ has an average value of 0.5 to 2.25. Examples of organic radicals represented by the symbol $R^4$ are as follows: alkyl groups, such as methyl, ethyl, propyl, isopropyl, butyl, isobutyl, amyl, hexyl and the like; aryl groups, such as phenyl, naphthyl and the like; alicyclic groups, such as cyclopentyl, cyclohexyl and the like; aralkyl groups, such as benzyl, phenylethyl and the like; alkaryl groups, such as tolyl, ethylphenyl, xylyl, mesityl and the like; alkenyl groups, such as vinyl, allyl, methallyl and the like; and heterocyclic groups, such as furfuryl, thienyl, pyridyl and the like. The above organic radicals may also, if desired, contain substituents, such as halogen groups, amino groups, cyano groups, carboxy groups, nitro groups and the like. $R^6$ may be the same or different radicals throughout the molecule.

The polysiloxane resins are generally formed when $n$ has an average value from about 0.5 to about 1.75 while the polysiloxane elastomers are generally formed when $n$ has an average value from about 1.75 to about 2.25. The polysiloxane resins are preferably formed when $n$ has an average value from about 1.0 to about 1.5, while the polysiloxane elastomers are preferably formed when $n$ has an average value from about 1.95 to about 2.05.

The following non-limiting examples are given wherein all parts are by weight unless the contrary is stated to further illustrate the present invention.

Example 1

56 parts of propargyl alcohol and 87 parts of methacrylic acid are admixed in a reaction vessel. To this mixture are added 2.86 parts of toluene sulfonic acid catalyst and 200 parts by volume of anhydrous toluene diluent. The reactants are heated to reflux under a nitrogen atmosphere. Water is removed from the reaction as it forms as an azeotrope with toluene. During a period of 12 hours, 18 parts of water are collected. The reaction mass is then cooled to room temperature, and washed with about 100 parts of 2% aqueous sodium carbonate. The reaction mass is then fractionally distilled at 50–55° C. at atmospheric pressure for 15 minutes. A total of about 37.2 parts of propargyl methacrylate are collected. The propargyl methacrylate product has a boiling point of 35° C./5 mm. Hg and has the following structure as determined by infrared analysis:

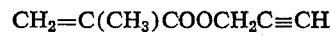

Example 2

Into a 3-necked reaction vessel equipped with thermometer, magnetic stirrer, addition funnel, and Dry-Ice condenser with Dririte tube attached are added 37.2 parts of propargyl methacrylate prepared according to the method of Example 1, 0.4 part of hydroquinone, and 0.072 part of a platinum-containing compound. The platinum-containing compound is obtained by dissolving 1 mole of $H_2PtCl_6 \cdot 6H_2O$ in 7 moles of octyl alcohol. This platinum-alcohol solution is maintained at a temperature of 75°–80° C. and a pressure of approximately 15 to 20 mm. Hg for 60 hours while the ratio of chlorine to platinum is reduced to 2 atoms of chlorine per atom of platinum. The condenser is charged with Dry Ice, and the reaction mass is heated to 60–65° C. Then with gentle stirring, 45 parts of trichlorosilane are added dropwise to the reaction mass over a three-hour period while maintaining the temperature at 60–65° C. The reactants are kept at 60–65° C. for an additional 9 hours at which time the reaction is more than 95% complete. The reaction mixture is cooled to room temperature and 0.2 part of phenothiozine are added to the reaction mixture. The product is distilled in a molecular still under a vacuum of 1.5 mm. Hg at a temperature range of 80–120° C. 73.5 parts of methacryloxypropenyltrichlorosilane having a boiling point of 91–98° C./1.5 mm. Hg are obtained. This corresponds to 94% theoretical yield based on the propargyl methacrylate. The product corresponds to the following structural formulas and weight percents as determined by vapor phase chromatography 60 percent of $Cl_3SiCH=CH-CH_2OOC-C(CH_3)=CH_2$ (α isomer)

and 40 percent of $Cl_3SiCCH_2OOCC(CH_3)=CH_2$ (β isomer)

In addition, the product contains 3 parts of unreacted starting materials and 4.5 parts of a residue boiling above 120° C. at 1.5 mm. Hg. 0.17 part of hydroquinone are added to the product to retard polymerization during storage.

Example 3

50 parts of the methacryloxypropenyltrichlorosilane prepared according to the method of Example 2 are fractionally distilled in a distillation column packed with helical glass packing at a pressure of 1.5 mm. of Hg and a temperature of 88–91° C. The overhead from the column is condensed and the condensed product is the β isomer represented by the formula

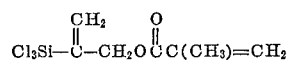

as determined by vapor phase chromatography. The residue of the distillation is the α isomer represented by the formula

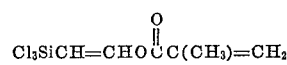

as determined by vapor phase chromatography.

Example 4

Into a three-necked reaction vessel equipped with thermometer, magnetic stirrer, addition funnel, and Dry-Ice condenser with Dririte tube attached are added 186 parts of a methacryloxypropenyltrichlorosilane prepared according to the method disclosed in Example 2, and 0.4 part of phenothiazine. 80 parts of anhydrous methanol are charged to the addition funnel and the methanol is added dropwise to the reaction mixture with agitation over a period of 1 hour. During the addition of the methanol, the reaction mixture is heated to 70 to 80° C. Also during the addition of methanol, HCl gas is constantly being evolved. The reaction mass is then distilled by heating at 75° C. under a vacuum of 15 mm. of Hg of absolute pressure to remove excess methanol and lower boiling materials. The reaction product is then analyzed and found to contain 0.13% hydrolyzable chloride and is then treated with an additional 25 parts of methanol for a period of 15 minutes at 75° C. The reaction mixture is then distilled in a molecular still under a vacuum of 0.5 mm. Hg at a temperature range of 80–120° C. whereby 137 parts of methacryloxypropenyltrimethoxysilane having a boiling point of 110 to 113° C./3.5 mm. Hg are obtained. This amounts to about 77.5% of the theoretical yield. This silane product corresponds to the following structural formulas and weight percents as determined by vapor phase chromatography:

60 percent of $(CH_3O)_3SiCH=CHCH_2OOCC(CH_3)=CH_2$ (α isomer)

and 40 percent of

 (β isomer)

In addition, the product contains 31 parts of higher boiling residues. 0.5 part of hydroquinone are added to the product to retard polymerization during storage.

Example 5

Example 4 is repeated except that the methacryloxypropenyltrichlorosilane is not subjected to fractional distillation prior to the methoxylation. The yield of methacryloxypropenyltrimethoxysilane is about 60% of the theoretical yield.

Example 6

Into a three-necked reaction vessel equipped with thermometer, magnetic stirrer, addition funnel and Dry-Ice condenser with Dririte tube attached are added 37.2 parts of propargyl methacrylate prepared according to the method described in Example 1, 0.4 part of hydroquinone and 0.072 part of a platinum-containing compound. The platinum-containing compound is obtained by dissolving 1 mole of $H_2PtCl_6 \cdot 6H_2O$ in 7 moles of octyl alcohol. This platinum-alcohol solution is maintained at a temperature of 75° to 80° C. and a pressure of approximately 15 to 20 mm. of Hg for 60 hours while the ratio of chlorine to platinum is reduced to 2 atoms of chlorine per atom of platinum. The condenser is charged with Dry Ice, and the reaction mass is heated to 60 to 65° C. Then with gentle stirring, 40.6 parts of trimethoxysilane are added dropwise to the reaction mass over a three-hour period while maintaining the temperature at 60 to 65° C. The reactants are kept at 60–65° for an additional 9 hours at which time the reaction is more than 95% complete. The reaction mixture is cooled to room temperature and 0.2 part of phenothiazine are added to the reaction mixture. The product is distilled in a molecular still under a vacuum of 0.5 mm. Hg at 80–120° C. 69.9 parts of methacryloxypropenyltrimethoxysilane having a boiling point of 110° to 113° C./3.5 mm. Hg are obtained. This corresponds to about 94% theoretical yield based on the propargyl methacrylate. The silane produce corresponds to the following structural formulas and weight percents as determined by vapor phase chromatography:

35 percent of $(CH_3O)_3SiCH=CHCH_2OOCC(CH_3)=CH_2$ (α isomer)

and 65 percent of

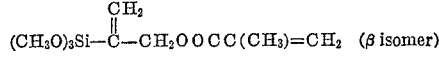 (β isomer)

Example 7

50 parts of the methacryloxypropenyltrichlorosilane prepared according to the method of Example 6 are fractionally distilled in a distillation column packed with helical glass packing at a pressure of 0.5 mm. of Hg and a temperature of 85–87° C. The overhead from the column is condensed and the condensed product is the β isomer represented by the formula

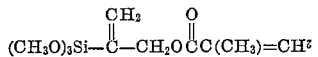

as determined by vapor phase chromatography. The residue of the distillation is the α isomer represented by the formula

as determined by vapor phase chromatography.

The above examples clearly demonstrate the efficacy of the method of the present invention. It is quite apparent that not only is it possible to control the quantity of the alpha and beta isomers within certain limits by selectivity of the method of the present invention but it is also possible to obtain excellent yields. Accordingly, the process of the present invention is quite suitable from an economical and commercial viewpoint.

What is claimed is:

1. Compound of the formula:

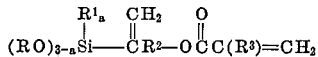

wherein R is hydrogen or an alkyl radical containing up to about 6 carbon atoms; $R^1$ is halogen or is monovalent hydrocarbon radical free of non-benzenoid unsaturation; $R^2$ is divalent hydrocarbon radical; $R^3$ is hydrogen or methyl; *a* is a whole number integer from 0 to 3 inclusive.

2. The compound of claim 1 wherein $R^1$ is chlorine and R is methyl.

3. The compound of claim 2 wherein *a* is 3.

4. The compound of claim 2 wherein *a* is 0.

5. The compound of claim 1 wherein $R^2$ is $CH_2$.

6. The compound of claim 5 wherein *a* is 3, $R^1$ is chlorine, and $R^3$ is $CH_3$.

7. The compound of claim 5 wherein *a* is 0, R is methyl, and $R^3$ is $CH_3$.

8. Isomeric mixture containing:
   (A) about 30 to about 70% by weight of the compound of claim 1; and
   (B) about 70 to about 30% by weight of the compound represented by the formula:

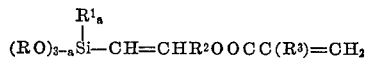

wherein R, $R^1$, $R^2$, $R^3$, and *a* have the same meanings as defined in claim 1.

9. The isomeric mixture of claim 8 which contains about 35% by weight of (A) and about 65% by weight of (B).

10. The isomeric mixture of claim 8 which contains about 40% by weight of (A) and about 60% by weight of (B).

11. The isomeric mixture of claim 8 wherein R of each formula is $CH_3$, $R^1$ of each formula is chlorine, $R^2$ of each formula is $CH_2$, and *a* of each formula is zero or 3.

12. The isomeric mixture of claim 11 wherein $R^3$ of each formula is $CH_3$.

13. Process for preparing compounds represented by the formulas:

(I) 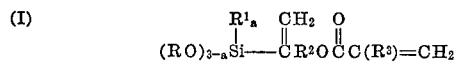

and (II) 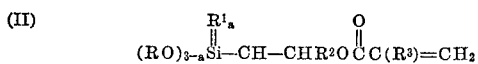

wherein R is hydrogen or an alkyl radical containing up to about 6 carbon atoms; $R^1$ is halogen or is monovalent hydrocarbon radical free of non-benzenoid unsaturation; $R^2$ is divalent hydrocarbon radical; $R^3$ is hydrogen or methyl; *a* is a whole number integer from 0 to 3 inclusive, which comprises reacting at a temperature of up to 90° C. a silane having SiH bond with an acetylenically unsaturated ester of the formula:

wherein $R^2$ and $R^3$ have the same meanings as defined above, in the presence of a catalytic amount of a platinum-containing material for a time sufficient to produce the compounds represented by Formulas I and II, wherein the platinum-containing compound is a complex formed from chloroplatinic acid with up to 2 moles per gram atom of platinum of a member selected from the group consisting of alcohols of the formula $R^4OH$, ethers of the formula $R^4OR^5$, aldehydes of the formula $R^4CHO$, and mixtures thereof wherein $R^4$ is a member selected from the class of alkyl radicals having at least 4 carbon atoms, alkyl radicals substituted with an aromatic hydrocarbon radical, and alkyl radicals substituted with an $OR^5$ wherein $R^5$ is a member selected from the group of monovalent hydrocarbon radicals free of aliphatic unsaturation and monovalent radicals free of aliphatic unsaturation and consisting of carbon, hydrogen, and oxygen with each oxygen atom being attached to two atoms at least one of which is a carbon atom and up to one of which is a hydrogen atom.

14. The process of claim 13 which is carried out at a temperature of from 50 to 65° C.

15. The process of claim 13 wherein said platinum-containing compound is obtained by dissolving one mole of $H_2PtCl_6 \cdot 6H_2O$ is 7 moles of octyl alcohol and maintaining the platinum-alcohol solution at a temperature of 75° to 80° C. and a pressure of approximately 15 to 20 mm. for 60 hours while the ratio of chlorine to platinum is reduced to 2 atoms of chlorine per atom of platinum; and wherein a polymerization inhibitor is employed.

16. The process of claim 15 wherein the polymerization inhibitor is hydroquinone.

17. The process of claim 13 which further includes a distillation carried out in the presence of an inhibitor; and wherein the vapor path in said distillation is unobstructed and condensation occurs at a distance from the evaporation which is less than the mean free path of the evaporating molecules.

18. The process of claim 17 wherein said polymerization inhibitor is phenothiazine.

19. The process of claim 13 wherein said silane containing Si—H bond is trichlorosilane and wherein said reaction further includes a methoxylation step.

20. The process of claim 13 wherein said silane containing Si—H bond is trimethoxysilane.

References Cited
UNITED STATES PATENTS 3,555,051   1/1971   Marsden et al. ____ 260—348 SC DANIEL E. WYMAN, Primary Examiner PAUL F. SHAVER, Assistant Examiner U.S. Cl. X.R.

260—448.2 E, 448.2 Q, 448.8 R